United States Patent [19]

Delichte

[11] Patent Number: 4,706,609
[45] Date of Patent: Nov. 17, 1987

[54] LIVESTOCK FEEDER FOR CYLINDRICAL BALES

[76] Inventor: Lawrence G. Delichte, General Delivery, Ste. Alphonse, Manitoba, Canada, R0K 1Z0

[21] Appl. No.: 872,917

[22] Filed: Jun. 11, 1986

[51] Int. Cl.$^4$ .............................................. A01K 5/00
[52] U.S. Cl. ........................................ 119/60; 119/58
[58] Field of Search ............................ 119/58, 59, 60

[56] References Cited

U.S. PATENT DOCUMENTS

| | | | |
|---|---|---|---|
| 387,892 | 8/1888 | Light | 119/60 |
| 1,319,060 | 10/1919 | Gardon | 119/60 |
| 2,122,591 | 7/1938 | Smrekar, Sr. | |
| 2,491,577 | 12/1949 | Olinger | |
| 2,533,984 | 12/1950 | Anson | |
| 2,768,607 | 10/1956 | McClure, Jr. | |
| 3,020,881 | 2/1962 | Strom | 119/58 |
| 3,626,468 | 12/1971 | Hanson | 119/60 |
| 3,777,713 | 12/1973 | Deats | 119/60 |
| 3,834,353 | 9/1974 | Groezinger | |
| 3,851,624 | 12/1974 | Peak | 119/60 |
| 3,881,449 | 5/1975 | Burrack | |
| 3,892,202 | 7/1975 | Feterl | |
| 3,906,903 | 9/1975 | Vandewater | 119/62 |
| 4,067,298 | 1/1978 | Jones et al. | |
| 4,193,378 | 3/1980 | Harden | |
| 4,294,197 | 10/1981 | Snel et al. | |
| 4,346,671 | 8/1982 | Wagner | |

FOREIGN PATENT DOCUMENTS 1292185 10/1972 United Kingdom ................. 119/58

Primary Examiner—William F. Pate, III
Assistant Examiner—Creighton Smith
Attorney, Agent, or Firm—Adrian D. Battison

[57] ABSTRACT

A livestock feeder device comprises an inner frame defined by an upper circular rail and a lower circular rail resting against the ground together with a number of uprights for receiving and confining a cylindrical bale. An outer frame around the inner frame is defined by a lower panel and an upper area having inclined spaced bars arranged so that the animal can present its head through the bars but is halted at the shoulder. The spacing between the inner and outer frames is such that the animal can reach the bale and is encouraged by the frame to eat with its head remaining between the inner and outer frames so as to deposit any waste in that area for subsequent eating. This avoids the trampling of any waste and thus reduces losses.

8 Claims, 3 Drawing Figures

U.S. Patent   Nov. 17, 1987   4,706,609
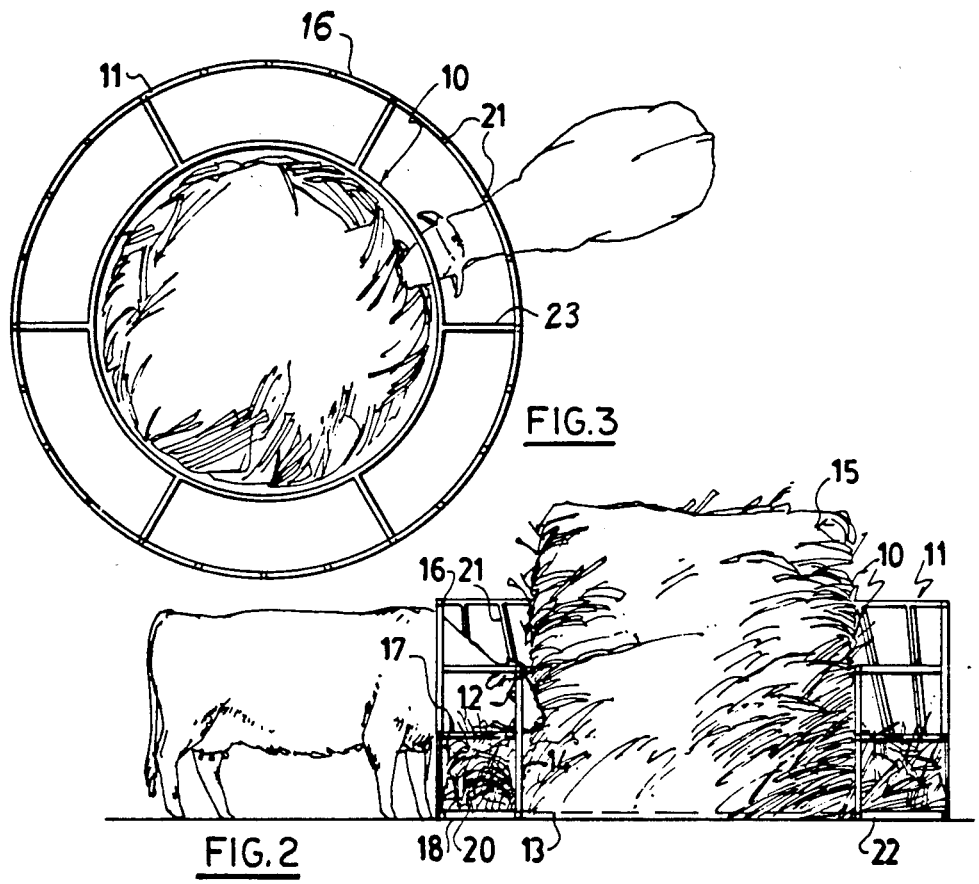
FIG.3
FIG.2
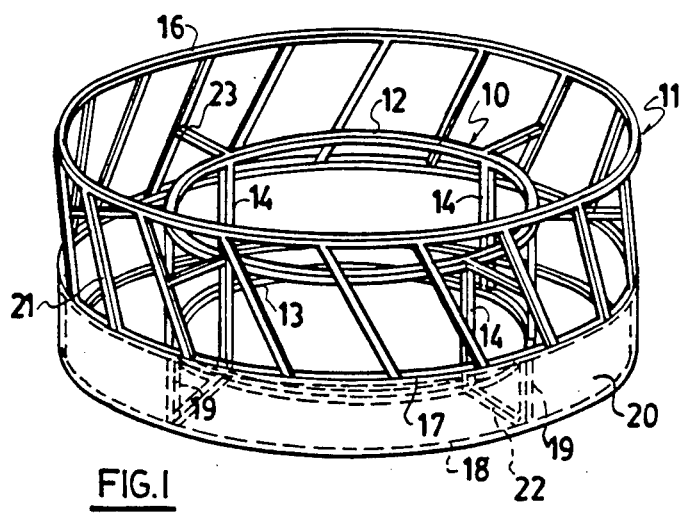
FIG.1

LIVESTOCK FEEDER FOR CYLINDRICAL BALES

BACKGROUND OF THE INVENTION

This invention relates to a livestock feeder for use in dispensing cylindrical bales to a group of animals and particularly cattle.

As cattlemen well know, merely depositing a large bale in a pen containing group of cattle leads to significant amounts of waste which can amount to 50% of the bale. This is because the animals tend to pick the best parts from the bale and to break up the bale while so doing following which other parts of the bale become trampled and soiled and are no longer eaten.

This problem has to some extent been reduced by the manufacture of feeders which basically comprise a cylindrical frame within which the bale is placed, the frame including a number of bars which prevent the animal from entering the frame while allowing the animal to place its head through the bars to grasp the feed material for eating. However, there remain significant losses with a device of this type. The present inventor has observed carefully the use of such apparatus and has found that the reason for such losses is that the animal tends to place its head into the frame aarrangement to grasp the best portion of the material and then tends to remove its head from the frame to eat the material and in some cases drops poorer material onto the ground around its feet which again becomes trampled.

It is one object of the present invention, therefore, to provide an improved livestock feeder of this general type which yet further reduces waste.

According to a first aspect of the invention, therefore, there is provided a feeder for receiving a large cylindrical bale for distributing the bale to a group of animals comprising a inner rail member arranged and dimensioned to surround the bale and to act as a confining member therefor, an outer frame arrangement surrounding the rail member including a plurality of spaced bars arranged and dimensioned such that the bars prevent the body of the animal from passing through the frame to the inner rail while allowing the head and neck to pass therethrough, and means interconnecting the frame and the inner rail member arranged to support the rail member in spaced position from the ground and to maintain the spacing between the frame and the rail member such that the head of the animal can be received therebetween and such that the animal can reach the bale inside the rail member.

According to a second aspect of the invention, there is provided a feeder for receiving a large cylindrical bale for distribution to a group of animals comprising a cylindrical inner frame structure arranged and dimensioned to surround the bale and to act as a confining member therefor and comprising an upper rail, a lower rail for resting on the ground and a plurality of struts interconnecting the upper and lower rails, an outer frame structure surrounding the inner frame structure including an upper rail member, a lower rail member and a plurality of spaced bars arranged and dimensioned such that the bars prevent the body of the animal from passing through the frame to the inner frame structure while allowing the head and neck to pass therethrough, and means interconnecting the outer frame structure and the inner frame structure arranged such that the feeder forms an integral, movable structure having an open base defined by said lower rail and said lower rail member both of which can rest on the ground and arranged to maintain the spacing between the inner frame structure and the outer frame structure such that the head of the animal can be received therebetween and such that the animal can reach the bale inside the inner frame structure with its body outside the outer frame structure.

The invention therefore has the advantage that the animal is kept out of the area immediately surrounding the bale by the outer frame structure. In addition and more importantly the animal tends to eat with its head inserted between the bars of the outer frame structure so that when it grasps a portion of the bale, it tends to retain its head within the outer frame structure in the space between the outer frame structure and the inner rail so that any material dropped from the eating process collects between the outer frame structure and the inner rail and remains untrampled and unsoiled.

Preferably the inner frame structure includes the inner rail which engages the ground so that this assists in confining the bale and if the apparatus is moved by pushing by the animals, the ground rail tends to move any material inside the inner frame along with the whole structure. This prevents the material from working its way out under the edges of the outer frame for trampling and waste.

A further preferred feature provides a skirt around the lower edge of the outer frame structure defined between a bottom rail and an intermediate rail and formed of a sheet material so as yet further to confine the feed material between the outer frame structure and the inner frame.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is an isometric view of a livestock feeding device according to the invention.

FIG. 2 is a cross sectional view of the device of FIG. 1 including a bale and an animal eating from the bale.

FIG. 3 is a top plan view of the device of FIG. 1 including the bale and the animal.

In the drawings like characters of reference indicate corresponding parts in the different figures.

DETAILED DESCRIPTION

The device as shown in the drawings includes an inner frame 10 and an outer frame 11. The inner frame 10 comprises an upper rail 12, a lower rail 13 and a plurality of uprights 14. The upper and lower rails 12, 13 are circular and of the same diameter so that the uprights 14 lie in the surface of a cylinder defined by the upper and lower rails. The dimension of this cylinder is just greater than that of the intended bale indicated in FIG. 2 at 15. In practice the diameter may be of the order of 6 inches to 1 foot greater than that of the bale and thus of the order of 7 feet in one example. The lower rail 13 is arranged directly at the bottom of the frame so that it rests upon the ground. There are 6 uprights 14 spaced equi-angularly around the rails 12 and 13 so as to form the substantially rigid cylindrical arrangement for surrounding the bale 15 and retaining it in position.

The outer frame 11 comprises an upper rail 16, an intermediate rail 17 and a lowermost rail 18. Each of the rails is circular and of a diameter greater than the inner frame so as to form an outer frame surrounding the inner frame and spaced therefrom. A lowermost rail 18 is arranged in the same plane as the rail 13 so as to rest on the ground in a normal position of the device. The intermediate rail 17 is spaced upwardly therefrom at a distance of the order of 18 inches and is interconnected thereto by a number of uprights 19 which may again be six in number and positioned at the same angular location as the uprights 14. Covering both of the rails 17 and 18 and the uprights 19 is a strip 20 of sheet metal thus forming a skirt closing the lowermost area of the outer frame. The height of the intermediate rail is chosen relative to the height of the animal such that it can comfortably reach over without pressing the throat. The sheet material can be impestorate metal or can be a mesh such as chicken wire.

Between the intermediate rail 17 and the upper rail 16 is positioned a plurality of bars 21. The spacing between each bar and the next adjacent bar is arranged such that the head and neck of the animal can pass between the bars but the shoulders of the animal and therefore the body are prevented from passing therethrough.

It will be appreciated that the device is designed for use with a particular size of animal and particularly either a mature cow or a young animal and in such cases the sizing of the bars can be different to accommodate the different size of animal. In addition the bars are inclined relative to a vertical line lying in the cylinder defined by the rails. This allows the bars to accommodate animals of different heights while preventing smaller animals from trying to jump through the bars. In addition it allows the animals to more readily extracate their head from between the bars by a slight twisting movement which allows the horns to pass by so that the bars can be more closely spaced.

The outer frame is interconnected to the inner frame by a plurality of cross members 22 which interconnect the lower rail 18 of the outer frame to the lower rail 13 of the inner frame. Again the cross members 22 can be positioned at angularly aligned locations relative to the uprights 14 and 19 and therefore in the example shown there are six such cross members. In addition there are six upper cross members 23 which extend between the upper rail 12 of the inner frame and the bars 21 of the outer frame. The angular position of the upper cross members 23 can again be aligned with the lower cross members 22 and the positioning of the bars 21 arranged accordingly.

It will be noted that the height of the upper rail 12 of the inner frame is significantly lower than the height of the upper rail 16 of the outer frame. The height of the latter is arranged such that it is above the shoulder line of the animal so that the head and neck can again pass readily and comfortably beneath the rail 16. This height allows the animal to eat comfortably with its head in a desired position and also is a height which deters attempts at jumping the rail. Of course an excessive height should be avoided for reasons of economy and manoevrability. The height of the rail 12 of the inner frame is arranged to be approximately midway along the height of the bale. In one example, the height of the rail 16 can be four feet and the height the rail three feet to accommodate a five foot bale.

The length of the cross members 22 is of course constant around the frames thus centralizing the inner frame within the outer frame. In addition the length is of the order of 18 inches to 2 feet which is just sufficient for the animal to reach across the space to the feed material of the bale 15.

The underside or base of the device is open apart from the rails and cross members so that it is relatively light and can be moved either by the animals or by simple lifting by a front end loader.

In operation a bale is positioned inside the inner frame either by lowering the bale from above into the cylindrical area defined by the inner frame or alternatively by lifting the frame over a positioned bale on the ground. The animals are then released to gain access to the device in which case they will sort themselves around the device at suitable positions between the different bars 21 with the number of animals being chosen in dependence upon the number of stations available for eating.

When the animals gain access to the device, they can place their head between the bars 21 as previously explained to reach a position where their shoulders engage the bars and prevent further movement into the outer frame. At that position the head can freely be received within the area between the inner and outer frames and yet the mouth of the animal can reach beyond the inner frame to the bale. The animal thus tends to grasp material from the bale and to commence eating of that material with any waste dropping from the mouth of animal falling into the area between the inner and outer frames that is out of the area which the front feet of the animal can reach. The animals can thus clean up around the bale by eating the material deposited into that area after they have eaten all the choice pieces in the bale and are resigned to eating the remainder in order to obtain enough feed. They can, when ground conditions permit, access material finally remaining in the central area inside the inner frame by pushing the device across the ground until they can reach the material from their position at the outer frame. In other cases a small cone of material can remain but does not interfere with a further bale being placed inside the inner frame.

The amount of waste therefore is significantly reduced since the waste is collected within the outer frame, as much as is possible, with the animal being encouraged by the construction of the frame to eat with its head remaining between the inner and outer frame.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limitng sense.

I claim:

1. A feeder for receiving a large cylindrical bale for distributing the bale to a group of animals all of which are of substantially the same size, the feeder comprising an inner frame structure arranged and dimensioned to surround the bale and to act as a confining structure therefor, an outer frame structure surrounding the inner frame structure including a plurality of spaced bars arranged and dimensioned such that the bars prevent the body of the animal from passing through the outer frame structure to the inner frame structure while allowing the head and neck to pass therethrough, and means interconnecting the outer frame structure and the inner frame structure arranged to support the inner frame structure in spaced position from the ground and to maintain the spacing between the outer frame structure and the inner frame structure such that the head of the animal can be received therebetween and such that the animal, with its body maintained exteriorly of the outer frame structure by said bars, can reach the bale inside the inner frame structure for feeding therefrom, wherein said outer frame structure includes an upper rail, a bottom rail and an intermediate rail member between said upper and lower rail members, all of said rails being of the same shape and lying in parallel planes, said bars being arranged between said upper rail and said intermediate rail and skirt means extending between said intermediate rail and said bottom rail.

2. The invention according to claim 1 wherein the outer frame structure includes an upper rail and a lower rail of the same shape as the upper rail and parallel thereto, said bars lying in a surface defined by said upper rail and said lower rail and being inclined to the vertical.

3. A feeder for receiving a large cylindrical bale for distribution to a group of animals all of which are of substantially the same size, the feeder comprising a cylindrical inner frame structure arranged and dimensioned to surround the bale and to act as a confining member therefor and comprising an upper rail, a lower rail for resting on the ground and a plurality of struts interconnecting the upper and lower rails, an outer frame structure surrounding the inner frame structure including an upper rail member, a lower rail member and a plurality of spaced bars arranged and dimensioned such that the bars prevent the body of the animal from passing through the outer frame structure to the inner frame structure while allowing the head and neck to pass therethrough, and means interconnecting the outer frame structure and the inner frame structure arranged such that the feeder forms an integral, movable structure having an open base defined by said lower rail and said lower rail member both of which can rest on the ground and arranged to maintain the spacing between the inner frame structure and the outer frame structure such that the head of the animal can be received therebetween and such that the animal can reach the bale inside the inner frame structure for feeding while its body is maintained outside the outer frame structure by said bars, wherein said outer frame structure includes an upper rail, a bottom rail and an intermediate rail member between said upper and lower rail members, all of said rails being of the same shape and lying in parallel planes, said bars being arranged between said upper rail and said intermediate rail and skirt means extending between said intermediate rail and said bottom rail.

4. The invention according to claim 3 wherein said interconnecting means includes a plurality of substantially radially inwardly projecting connecting struts between the lower rail of said inner frame and said lower rail member of said outer frame.

5. The invention according to claim 3 wherein the bars of the outer frame structure lie in a surface defined by said upper rail member and said lower rail member and are inclined to the vertical.

6. The invention according to claim 3 wherein said outer frame structure includes an intermediate rail member between said upper and lower rail members, said bars being arranged between said upper rail member and said intermediate rail member and skirt means extending between said intermediate rail member and said bottom rail member.

7. The invention according to claim 3 wherein the height of the upper rail of the outer frame structure from the ground is such that the animal, when standing normally, can comfortably place its head beneath the upper rail member.

8. A method of feeding a large cylindrical bale to a group of animals all of which are substantially the same size, comprising confining the bale within an inner frame structure arranged and dimensioned to surround the bale and to act as a confining member therefor, providing an outer frame structure surrounding the inner frame structure including a plurality of spaced bars, arranging the bars and the spacing therebetween such that the bars prevent the body of the animal from passing through the outer frame structure to the inner frame structure while allowing the head and neck to pass therethrough, and maintaining a spacing between the outer frame structure and the inner frame structure such that the head of the animal with its body maintained exteriorly of said outer frame structure by said bars, can be received therebetween and such that the animal can reach the bale inside the inner frame structure for feeding therefrom.

* * * * *